(12) United States Patent
Savoy et al.

(10) Patent No.: US 6,971,175 B2
(45) Date of Patent: Dec. 6, 2005

(54) ASSEMBLY LINE AND METHOD FOR VEHICLE BODY MANUFACTURING

(75) Inventors: Mark A. Savoy, Metamora, MI (US); Thomas J. Carter, Shelby Township, Macomb County, MI (US)

(73) Assignee: Utica Enterprises, Inc., Shelby Township, MI (US)

( * ) Notice: Subject to any disclaimer, the term of this patent is extended or adjusted under 35 U.S.C. 154(b) by 222 days.

(21) Appl. No.: 10/429,425

(22) Filed: May 5, 2003

(65) Prior Publication Data

US 2004/0221438 A1 Nov. 11, 2004

(51) Int. Cl.$^7$ .............................................. B62D 65/00

(52) U.S. Cl. ............... 29/897.2; 29/407.05; 29/407.09; 29/407.1; 29/430; 29/783; 29/791; 33/286; 33/DIG. 21; 73/865.8

(58) Field of Search .......................... 29/897.2, 407.01, 29/407.05, 407.09, 407.1, 430, 709, 711, 29/712, 714, 783, 791; 73/865.8, 432.1; 33/283, 33/545, DIG. 21; 270/52.18, 58.09

(56) References Cited

U.S. PATENT DOCUMENTS

| | | | | |
|---|---|---|---|---|
| 4,976,026 A | * | 12/1990 | Dacey, Jr. ..................... | 29/714 |
| 5,168,453 A | * | 12/1992 | Nomaru et al. ............. | 700/114 |
| 5,515,613 A | * | 5/1996 | Hinson ........................ | 33/288 |
| 6,317,953 B1 | * | 11/2001 | Pryor ...................... | 29/407.04 |
| 6,327,768 B1 | * | 12/2001 | Cappa et al. ............... | 29/407.1 |
| 6,389,698 B1 | * | 5/2002 | Malatier ..................... | 29/897.2 |
| 6,509,576 B2 | * | 1/2003 | Woo-Dong ............ | 250/559.33 |
| 6,675,467 B2 | * | 1/2004 | Oatridge et al. ............... | 29/771 |
| 6,796,035 B2 | * | 9/2004 | Jahn et al. ..................... | 33/193 |
| 2002/0029452 A1 | * | 3/2002 | Cappa et al. ............ | 29/407.05 |

* cited by examiner

Primary Examiner—Marc Jimenez
Assistant Examiner—Jermie E. Cozart
(74) Attorney, Agent, or Firm—Brooks Kushman P.C.

(57) ABSTRACT

A vehicle body assembly line (10) and method for assembling vehicle bodies utilizes electromagnetic gauging apparatus (44) to generate production gauge data of an assembly of formed sheet metal components, and an electrical controller (38) compares the production gauge data to design gauge data to detect any production deviation and is electrically connected to the assembly line to adjust the assembly of the formed sheet metal body components to correct any production deviation detected.

7 Claims, 1 Drawing Sheet

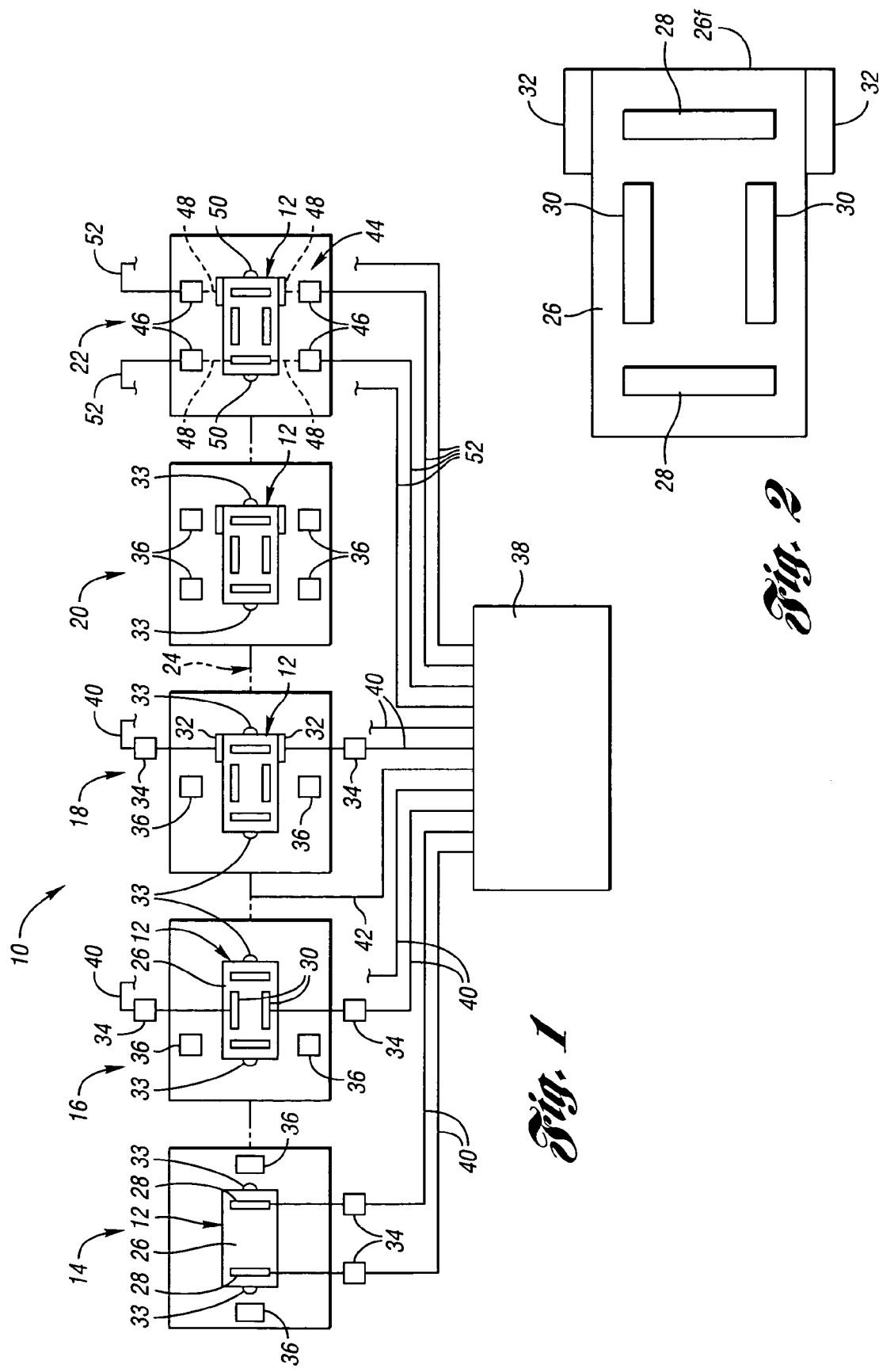

ASSEMBLY LINE AND METHOD FOR VEHICLE BODY MANUFACTURING

BACKGROUND OF THE INVENTION

1. Field of the Invention

This invention relates to a vehicle body assembly line and to a method for vehicle body manufacturing.

2. Background Art

Vehicle bodies are manufactured from formed sheet metal components that are assembled to each other, usually by welding and sometimes also by adhesives used with the welding. Normal conventional vehicle body manufacturing is performed by assembling an underbody assembly to which body side assemblies are assembled at a framing station to create what is referred to in the vehicle industry as a "body in white" since this is bare metal prior to any coating that provides corrosion resistance. The underbody assembly conventionally includes a floor pan having a front structure including a firewall, a center pan including longitudinal and lateral support ribs, and a rear pan including structural support for rear seats and also including a rear shelf that is located below the vehicle rear window. The body side assemblies conventionally includes a rear wheel housing, front, intermediate and rear pillars that define front and rear door openings for four door vehicles which is the predominant type of automobile in production today, although two door vehicles are also still made in limited quantities. Vans also include a fourth pillar as part of the body side assembly. After assembly of the "body in white", a roof, doors, fenders and other components are attached to complete the vehicle body manufacturing.

Vehicle bodies have a design shape from which production can deviate for various reasons. For example, formed sheet metal components from which the body assemblies are manufactured can have tolerance variations from one production run to the next and from production runs made on different tooling. Furthermore, the ambient temperature in the assembly factory can vary significantly during a production shift from a cooler temperature at the beginning to a much warmer temperature at the end, and the temperature increase will result in thermal expansion that can affect tolerance stackups that cause deviation from the intended design. For these and other reasons, it is difficult to manufacture vehicle bodies with a tolerance of less than plus or minus two millimeters from the design specifications.

Gauging stations have previously used laser gauges to detect production deviation from design specifications. The conventional manner in which such deviations has been corrected is by review of the production deviation from the gauging stations through meetings conducted by factory personnel including inspectors, production supervisors, and other managers who meet to determine the problem and the best way to provide a solution. Such correction can result in a significant number of production units with the deviation still present before any correction is made.

SUMMARY OF THE INVENTION

An object of the present invention is to provide an improved vehicle body assembly line for detecting and correcting any production deviation.

In carrying out the above object, the vehicle body assembly line of the invention includes electromagnetic beam gauging apparatus for gauging an assembly of formed sheet metal vehicle body components to generate production gauge data. An electrical controller of the assembly line compares the production gauge data to design gauge data to detect any production deviation and is electrically connected to the assembly line to adjust the assembling of the formed sheet metal vehicle body components to correct any production deviation detected.

The vehicle body assembly line includes an assembly station having positioners for locating the formed sheet metal vehicle body components at reference positions for assembly to each other, and the electrical controller operates the positioners of the assembly station to provide positioning adjustment of the formed sheet metal vehicle body components to correct any production deviation detected.

The vehicle body assembly line is also disclosed as including a gauging station where the electromagnetic beam gauging apparatus is located downstream from the assembly station, and the gauging station has positioners for locating the assembly of formed sheet metal vehicle body components at a reference position where electromagnetic beams generate the production gauge data which the electrical controller compares to design gauge data to detect any production deviation. The electrical controller operates the positioners of the assembly station to provide the positioning adjustment of the formed sheet metal vehicle body components to correct any production deviation detected. A conveyor conveys the assembly of formed sheet metal components from the assembly station to the gauging station.

The vehicle body assembly line disclosed actually includes a plurality of the assembly stations located upstream from the gauging station. Each assembly station includes positioners for locating formed sheet metal vehicle body components at reference positions for assembly to each other. The electrical controller operates the positioners of the assembly stations to provide positioning adjustment of the associated formed sheet metal vehicle body components to correct any deviation detected.

Another object of the invention is to provide an improved method for manufacturing vehicle bodies in a cyclical manner one after another.

In carrying out the above object, the method for cyclically manufacturing vehicle bodies in accordance with the invention is performed by positioning formed sheet metal vehicle body components to be assembled and then assembling the positioned components to each other. The assembly of formed sheet metal vehicle body components is then electrically gauged by electromagnetic beams to generate production gauge data. The production gauge data is electrically compared to design gauge data to detect any production deviation, and the formed sheet metal vehicle body components to be assembled during a future cycle are then electrically adjusted to correct any production deviation detected.

In performing the method, the formed sheet metal vehicle body components are assembled to each other at an assembly station and conveyed from the assembly station to a gauging station where the electromagnetic beam gauging is performed to generate the production gauge data that is compared to the design data to detect any production deviation that is then corrected in a future cycle by electrically adjusting the positioning of the formed sheet metal vehicle body components to be assembled.

In the method disclosed, the assembly of formed sheet metal vehicle body components is conveyed to at least one more assembly station from the initial assembly station and positioned for assembly of additional formed sheet metal vehicle body components thereto prior to conveyance to the gauging station where the electromagnetic beam gauging is performed to generate the production gauge data that is compared to the design data to detect any production deviation that is corrected in a future cycle at the appropriate assembly station by electrically adjusting the positioning prior to assembly.

The objects, features and advantages of the present invention are readily apparent from the following detailed description of the preferred embodiment when taken in connection with the accompanying drawings.

BRIEF DESCRIPTION OF THE DRAWINGS

FIG. 1 is a schematic plan view of a vehicle body assembly line constructed in accordance with the invention to perform the method of the invention for manufacturing vehicle bodies.

FIG. 2 is a plan view of a vehicle body center floor pan assembly manufactured in accordance with the invention.

DETAILED DESCRIPTION OF THE PREFERRED EMBODIMENT

With reference to FIG. 1, a vehicle body assembly line constructed in accordance with the invention is generally indicated by 10 and operates to perform the vehicle body manufacturing method of the invention as is hereinafter more fully described. Both the vehicle body assembly line 10 and the vehicle body manufacturing method will be described in an integrated manner to facilitate an understanding of all aspects of the invention.

The schematically indicated vehicle assembly line 10 shown in FIG. 1 provides assembly of a vehicle body center floor pan assembly 12 that is also illustrated in FIG. 2. This center floor pan assembly 12 is manufactured from formed sheet metal components that are welded to each other and subsequently welded to other assemblies to provide a completed vehicle body. It should be understood that the invention is applicable to vehicle body assembly lines for manufacturing vehicle body side assemblies and vehicle body doors, etc. and is not limited to the specific center floor pan assembly illustrated.

As shown in FIG. 1, the vehicle body assembly line 10 includes a first assembly station 14, a second assembly station 16, a third assembly station 18, a respotting station 20 where additional welding is performed, and a gauging station 22. A schematically indicated conveyor 24 provides conveyance between the different stations of the assembly during the vehicle body manufacturing. This manufacturing is performed in a cyclical manner such that the vehicle body assemblies are assembled one after another.

With reference to FIGS. 1 and 2, different components are assembled to the formed center floor pan 26 at the first, second and third assembly stations 14, 16 and 18. At the first assembly station 14, front and rear laterally extending support ribs 28 of formed sheet metal are welded to the floor pan 26. At the second assembly station 16, left and right longitudinally extending support ribs 30 are welded to the floor pan 26. At the third assembly station 18, left and right front lateral support extensions 32 are welded to the floor pan adjacent its front end. It should be appreciated that other floor pan assembly components are also conventionally incorporated and that the components illustrated are for illustrative purposes only. In addition, it is also understood that the vehicle body manufacturing as previously mentioned can be performed with any other vehicle body assemblies in addition to the floor pan assembly being described.

Each of the assembly stations 14, 16 and 18 includes fixed positioners 33 for positioning the center floor pan 26 at a reference position and also includes adjustable electrical positioners 34, which will normally be electrical servomotors, for positioning the associated floor pan components with respect to the floor pan prior to assembly. These electrical positioners 34 can provide one, two or three direction positioning as may be required for the assembly involved and can also be used for the center floor pan 26 instead of fixed positioners. The assembly is performed by schematically indicated welding robots 36 in a conventional manner. Furthermore, the respotting station 20 includes additional welding robots 36 for providing further welding in addition to the welding performed at the assembly station.

An electrical controller 38 of the assembly line is a programmable logic controller and has connections 40 to the electrical positioners 34 to control their operation as well as having unshown connections to the welding robots 36 and a connection 42 to the conveyor 24. This conveyor 24 conveys the floor pan through the assembly stations 14, 16 and 18 and through the respotting station 20 to the gauging station 22 as is hereinafter more fully described. It should be appreciated that the conveyor 24 can be of any suitable type, but will normally be a motor driven conveyor or a robotic conveyor in accordance with more current manufacturing designs for providing the transfer between the different stations.

As illustrated in FIG. 1, the gauging station 22 includes electromagnetic beam gauging apparatus collectively indicated by 44. More specifically, this gauging apparatus 44 includes laser gauges 46 that direct laser beams 48 toward the different assembled components with the assembly in a reference position provided by suitable positioners 50. Reflection of these laser beams back to the gauges 46 then provides production gauge data that is communicated by connections 52 to the controller 38 that operates the assembly line. The controller 38 then compares the production gauge data to design gauge data to detect whether there is any production deviation. If any such production deviation is detected by the controller 38, a signal is sent to the appropriate assembly station for the appropriate positioner 34 to provide adjustment to correct any production deviation detected. After the detection of the production deviation, the correction can be immediately performed on the next cycle. However, the correction does not always have to be performed when there is only one production deviation detected, since there may be times when a particular part being assembled is the only one which is out of tolerance and causes such deviation. Thus, it is possible to wait until two or more cycles of production deviations are detected before providing the adjustment that corrects the production deviation.

FIG. 2 illustrates the center floor pan assembly 12 and in solid line shows the designed position of the left and right front lateral support extensions 32 which are flush with the front edge $26_f$ of the floor pan 26. If a prior cycle of manufacturing indicated that these extensions 32 where too far forward as shown by phantom line representation, the appropriate adjustment would have been made at the third assembly station 18 prior to the assembly by the associated welding robots 36.

It should be appreciated that the electromagnetic beam gauging apparatus and the electrical controller that compares the production gauge data to design gauge data to detect production deviation and provide correction as described above can be embodied in different ways other than the specific way shown. For example, it is possible to have the electromagnetic beam gauging station provided downstream from a single assembly station; however, it should also be appreciated that the construction illustrated is efficient in that gauging of more than one assembly station from a single gauging station is most cost effective.

The vehicle body assembly line 10 and the vehicle body manufacturing method of the invention provide accurate component positioning which should result in a very tight tolerance range of less than about plus or minus one millimeter and more likely about plus or minus one half of a millimeter.

While the preferred practice of the invention has been described in detail, those familiar with the art to which this invention relates will recognize various alternative ways of practicing the invention as defined by the following claims.

What is claimed is:

1. A vehicle body assembly line comprising:
   an assembly station having electrically operated positioners for locating formed sheet metal vehicle body components at reference positions for assembly to each other;
   a conveyor for conveying the assembly of formed sheet metal vehicle body components from the assembly station;
   a gauging station to which the conveyor transfers the assembly of formed sheet metal body components, the gauging station having positioners for locating the assembly of formed sheet metal vehicle body components at a reference position and also having electromagnetic beam gauging apparatus for gauging the located assembly to generate production gauge data; and
   an electrical controller that compares the production gauge data to design data to detect any production deviation and that electrically operates the positioners of the assembly station to correct any production deviation detected.

2. A vehicle body assembly line comprising:
   a plurality of assembly stations each of which has electrically operated positioners for locating formed sheet metal vehicle body components at reference positions for assembly to each other;
   a conveyor for conveying the assembly of formed sheet metal vehicle body components from each assembly station to the next assembly station;
   a gauging station to which the conveyor transfers the assembly of formed sheet metal body components, the gauging station having positioners for locating the assembly of formed sheet metal vehicle body components at a reference position and also having electromagnetic beam gauging apparatus for gauging the located assembly to generate production gauge data; and
   an electrical controller that compares the production gauge data to design data to detect any production deviation and that electrically operates the positioners of the appropriate assembly station to correct any production deviation detected.

3. A method for manufacturing vehicle bodies in a cyclical manner one after another, comprising:
   positioning formed sheet metal vehicle body components to be assembled;
   assembling the positioned components to each other;
   electrically gauging by electromagnetic beams the assembly of formed sheet metal vehicle body components to generate production gauge data;
   electrically comparing the production gauge data to design data to detect any production deviation; and
   electrically adjusting the positioning of the formed sheet metal vehicle body components to be assembled during a future cycle to correct any production deviation detected.

4. A method for manufacturing vehicle bodies as in claim 3 wherein the formed sheet metal vehicle body components are assembled to each other at an assembly station and conveyed from the assembly station to a gauging station where the electromagnetic beam gauging is performed to generate the production gauge data that is compared to the design data to detect any production deviation that is then corrected in a future cycle by electrically adjusting the positioning of the formed sheet metal vehicle body components to be assembled.

5. A method for manufacturing vehicle bodies as in claim 4 wherein the assembly of formed sheet metal vehicle body components is conveyed to at least one more assembly station and positioned for assembly of additional formed sheet metal vehicle body components thereto prior to conveyance to the gauging station where the electromagnetic beam gauging is performed to generate the production gauge data that is compared to the design data to detect any production deviation that is then corrected in a future cycle at the appropriate assembly station by electrically adjusting the positioning prior to assembly.

6. A method for manufacturing vehicle bodies in a cyclical manner one after another, comprising:
   positioning formed sheet metal vehicle body components to be assembled at an assembly station and assembling the positioned components to each other;
   conveying the assembly of formed sheet metal vehicle body components from the assembly station to a gauging station and positioning the assembly at a reference position;
   electrically gauging by electromagnetic beams the reference positioned assembly of formed sheet metal vehicle body components at the gauging station to generate production gauge data;
   electrically comparing the production gauge data to design data to detect any production deviation; and
   electrically adjusting the positioning of the formed sheet metal vehicle body components to be assembled at the assembly station during a future cycle to correct any production deviation detected.

7. A method for manufacturing vehicle bodies in a cyclical manner one after another, comprising:
   positioning formed sheet metal vehicle body components to be assembled at a first assembly station and assembling the positioned components to each other;
   conveying the assembly of formed sheet metal vehicle body components from the first assembly station to a second assembly station and positioning thereof for assembly thereto of additional formed sheet metal vehicle body components;
   conveying the assembly of formed sheet metal vehicle body components from the second assembly station to a gauging station and positioning the assembly at a reference position;
   electrically gauging by electromagnetic beams the reference positioned assembly of formed sheet metal vehicle body components at the gauging station to generate production gauge data;

electrically comparing the production gauge data to design data to detect any production deviation; and electrically adjusting the positioning of the formed sheet metal vehicle body components to be assembled at the appropriate assembly station during a future cycle to correct any production deviation detected.

* * * * *